UNITED STATES PATENT OFFICE.

HERMANN SCHULZE-BERGE, OF PITTSBURG, PENNSYLVANIA, ASSIGNOR OF ONE-HALF TO JESSE H. LIPPINCOTT, OF SAME PLACE.

PROCESS OF ETCHING GLASSWARE.

SPECIFICATION forming part of Letters Patent No. 276,893, dated May 1, 1883.

Application filed November 8, 1882. (No specimens.)

*To all whom it may concern:*

Be it known that I, HERMANN SCHULZE-BERGE, of Pittsburg, in the county of Allegheny and State of Pennsylvania, have invented a new and useful Improvement in Processes of Etching Glassware; and I do hereby declare the following to be a full, clear, and exact description thereof.

The process of etching glass for the purpose of producing letters, figures, pictures, or ornamental designs on its surface has hitherto been accomplished either by coating the surface of the glass with a thin film of wax or similar substance which cannot be attacked or penetrated by hydrofluoric acid, tracing the letters or design thereon by means of an etching-needle, so as to remove the wax where the glass is to be etched, and then applying hydrofluoric acid, which acts on the glass on the exposed surface, or by means of a sand-blast, which is known as the "Tilghman process." The former of these processes is inconvenient, especially where a part only of the glassware is to be etched, as the whole surface of the article must be protected from the action of the acid, excepting the lines to be etched; and it is very tedious and expensive, as the entire pattern has to be traced by hand, which makes it difficult to reproduce the same design on several pieces of glassware. By the sand-blast process it is impossible to produce any work involving the tracing of fine lines or delicate patterns. By my improvement these difficulties are obviated. The covering of the entire article of glassware with wax and the use of liquid hydrofluoric acid are dispensed with; and while my process admits of tracing by hand the design to be etched on the glass, yet this is not necessary, and I am able to produce the most delicate patterns and designs, and reproduce them in fac-simile indefinitely, without resorting to tedious and expensive method of hand-drawing. These results I am enabled to effect by the application of some of the salts of fluorine, or fluorides of alkaline earths, or fluoride of ammonium to the surface of the glass, and then exposing the glass to a sufficient degree of heat to produce the chemical reaction necessary to etch the glass. The combinations of fluorine which I employ for this purpose are used either in the form of an aqueous solution, or mixed with other ingredients, so that they may be applied to the surface of the glass with a pen or brush, or impressed thereon by means analogous to printing, or by the use of a stencil and brush, or by other known means of transferring a pattern from a prepared type; or the powdered salts of fluorine or fluorides of alkaline earths may be used in a dry and comminuted condition, and dusted onto the surface of the glass on which the desired pattern or design has been previously drawn or impressed with a varnish or other preparation which will retain the powdered substance containing fluorine while the glass article is exposed to the requisite heat, as before stated.

The fluoride of sodium is one of the best salts of fluorine to use for the purposes of my process; but the fluorides of other fixed alkalies may be employed, and these may be mixed with the fluorides of alkaline earths, or with fluoride of ammonium, as hereinafter described. If any of the solid fluorides are employed, the substance is dried and reduced to a comminuted or pulverulent condition. The vehicle which is used for applying the fluoride of sodium or other salt of fluorine to the glass should be some moist and sticky substance capable of adhering to the glass without running, so as to preserve the lines of the pattern design, or writing to be impressed or traced therewith, and of forming an intimate and thorough mixture with the dry and pulverized fluoride. For this purpose a resinous substance of the required consistency—as Venice turpentine or other resin dissolved in some volatile solvent—may be used, or a solution of resin and beeswax in turpentine, or a mixture of water and glycerine, or undissolved solid fat, paraffine-wax, or soap may be used. Various other substances might be suggested as a vehicle for the fluorine compound, the requisite conditions being that it should be adapted to the tracing, painting, drawing, or printing of the proposed design on the glass, and that it should contain no ingredient which would itself decompose the glass when exposed to the degree of heat required in my process, and that it should be removed from the glass by the heat, leaving the fluoride behind. This vehicle or sticky mixture is then applied to the clean surface of the glass, so as to represent the letters, tracing, or design to be etched thereon. It may be used with a pen or brush when the design is to be drawn by hand on the glass, or it may be applied with a stencil-plate and brush, or it may be printed on the glass by means of a disk or plate of soft rubber on which is impressed in relief the design to be transferred to the glass. When the vehicle is thus applied to the glass the fluoride of sodium (or other comminuted fluorine compound) is dusted over it until a sufficient quantity adheres. This should be done as evenly as possible, and more or less of the fluoride applied, according to the character of the etching to be produced.

Instead of first applying the vehicle to the glass and then dusting over it the powdered fluoride, the fluoride may be mixed with the vehicle and both applied by the same means and at the same time. The glass article thus prepared is then placed in a cold or slightly-warm oven or furnace. The heat is then gradually raised to about 250° Fahrenheit, or until the turpentine or other volatile matter of the vehicle is evaporated, and then the heat is still further increased until the more solid matter of the vehicle is charred or burned away. At this stage of the process any change or improvement or correction may be made in the design or pattern impressed or painted on the glass. Then the heat is still further increased until the article of glassware is a little below a dark-red heat, when the fluorine commences to act upon the glass, the fluorine of the compound forming a chemical reaction with the silica of the glass and passing off as a volatile compound. The length of time to which the heat is continued will depend upon the degree of opacity desired to be given to the parts of the glassware acted upon by the fluorine, which should be a few minutes—say from three to ten—according to the degree of heat employed. Care should be taken not to raise the heat of the furnace to a degree which will soften the glass sufficiently to cause it to change its shape. The time required for the exposure of the glass article in the furnace after it comes to a dull-red heat will be only a few minutes. The article is then removed and cooled slowly. Nothing further is needful to complete the etching process.

In applying the vehicle or the mixture of the vehicle and fluoride to the glass when it is painted on by hand, it may be desirable to mix some color with it, so that the painter may be able to see the effect of his work. In this case some aniline color may be mixed with the vehicle or other pigment which will be removed by the heat and not discolor the glass.

Instead of using only fluorides of the fixed alkalies, (as fluoride of sodium or potassium,) other compounds or mixtures containing fluorine may be employed in the use of my process, such as the fluorides of the alkaline earths and volatile fluorides, as fluoride of ammonium.

It is not desirable to use the fluorides of the alkaline earths by themselves, if, indeed, they can be so used, for the reason that they do not act on the glass below a temperature at which glass is apt to begin to soften; but by mixing them with the fluorides of the fixed alkalies (as fluoride of sodium, &c.) the compound will melt and act to decompose the glass and unite with the silica at a temperature sufficiently low to prevent danger of the glass becoming deformed by heat. The addition of fixed alkalies increases the opacity of the etching. There is another mode in which the fluorides may be applied to the glass, which dispenses with the use of a sticky vehicle, and has the good effect of distributing the fluoride more evenly over the surface of the glass. As the fluorides of the alkalies are soluble in water, an aqueous solution may be made, which, if desired, may be thickened with a very little mucilaginous substance or glycerine. This solution may then be applied with a pen, brush, or stencil, and the article warmed until the water evaporates. It is then ready to be exposed to the requisite degree of heat in the oven or furnace. In this way fluoride of ammonium may be used instead of the fluorides of the fixed alkalies, for it cannot be applied in the manner first described in this specification, because it volatilizes at a temperature requisite to burn off the varnish, when that is used as a vehicle. When the fluorides of alkalies are used dissolved in water, as just described, the water evaporates and leaves the fluoride, in the form of minute crystals, on the surface of the glass. When exposed to heat, as hereinafter described, the water of crystallization is driven off and the deposited salts are apt to fall off. An addition of mucilage does not entirely obviate this difficulty. Hence it is better as soon as the drawing on the glassware is sufficiently dry to cover the decorated parts with a very thin film of transparent resinous varnish, by which the difficulty is obviated. If the glass surface to which the aqueous solution of salts of fluorine is applied be first warmed, the water will evaporate more quickly, and the tendency of the lines which are drawn on the glass to run into one another is avoided.

Fluoride of ammonium does not produce as great a degree of opacity in the etching as the fluorides of the fixed alkalies, and this fact may be taken advantage of to produce a more artistic effect in fine work. Different degrees of opacity may be produced in different portions of the same etching by applying to portions of the pattern or design the solution of fluoride of ammonium, or of the fluorides of the fixed alkalies dissolved in water, and to other parts the fluorides of the fixed alkalies and alkaline earths mixed with oil or other vehicle, or by using a different proportion of the fluorides in the vehicle or mixture applied to different portions of the design. A good result is also produced by applying the fluoride to the glass as a mixture of fluoride of sodium and fluoride of ammonium.

As the different fluorides produce different degrees of opacity in the finished work, my process affords the opportunity of producing effects which cannot be attained by either of the methods of etching on glass in use previous to my invention. In this connection it is well to notice that the degree of heat applied during the etching process has an effect on the opacity of the etching, which varies according to the different fluorides employed, and also with different mixtures of fluorides. For example, when the fluorides of the fixed alkalies are employed the opacity produced by the action of the fluorine passes away if the final heat is continued for a longer time than ordinary. A little care and experience on the part of the workman will enable him to utilize these variations of temperature and ingredients with good effect.

Having thus described my improved process of etching glassware, what I claim as my invention, and desire to secure by Letters Patent, is—

1. The process of etching or decorating glass by applying to its surface, by means of a suitable vehicle, the salts of fluorine, or other solid fluorides, and exposing it to the action of heat sufficient to produce a decomposing reaction between the fluorine so applied and the silica of the glass, substantially as described.

2. The process of etching or decorating glassware by painting, printing, or otherwise applying to its surface a mixture of comminuted alkaline fluorides with Venice turpentine or other suitable vehicle, exposing the glassware thus prepared to a gradually-increasing degree of heat in a suitable oven or furnace, first, to evaporate the volatile portions of the vehicle, then at a higher degree of heat to char or burn away the more solid constituents of the vehicle, and, lastly, by a still higher degree of heat to produce a chemical reaction between the silica of the glass and the fluorine so applied to it, substantially as described.

3. The process of etching or decorating glassware by applying to its surface, by means of writing, printing, or painting, a solution in water of an alkaline salt or salts of fluorine, and then exposing the glassware thus prepared, in a suitable oven or furnace, to a heat sufficient to produce a chemical reaction between the silica of the glass and the fluorine applied thereto, substantially as described.

4. The process of etching or decorating glassware by the application to the surface of the glass of fluoride of ammonium, or a mixture therewith of the fluoride of a fixed alkali, then evaporating the watery particles from the glassware, and then exposing it to heat in a furnace or oven sufficient in degree to produce a chemical reaction between the fluorine so applied and the silica of the glass, substantially as described.

5. The mixture of a comminuted solid fluoride with a vehicle of Venice turpentine or equivalent liquid resinous substance, for the purpose of applying fluorine to the surface of glassware preparatory to its exposure to heat in a furnace for the purpose of etching its surface, substantially as described.

6. The solution in water of a comminuted solid fluoride with or without an admixture of mucilage as an ink for writing or sketching on glassware preparatory to its exposure to heat in a furnace for the purpose of etching its surface, substantially as described.

In testimony whereof I have hereunto set my hand this 26th day of October, A. D. 1882.

HERMANN SCHULZE-BERGE.

Witnesses:
T. B. KERR,
W. B. CORWIN.